US010886833B2

(12) United States Patent
Liang et al.

(10) Patent No.: US 10,886,833 B2
(45) Date of Patent: Jan. 5, 2021

(54) INDUCTOR CURRENT EMULATION FOR OUTPUT CURRENT MONITORING

(71) Applicant: FAIRCHILD SEMICONDUCTOR CORPORATION, Sunnyvale, CA (US)

(72) Inventors: Enzhu Liang, Sunnyvale, CA (US); Kaiwei Yao, San Jose, CA (US); Ming Gu, San Jose, CA (US)

(73) Assignee: FAIRCHILD SEMICONDUCTOR CORPORATION, Phoenix, AZ (US)

( * ) Notice: Subject to any disclaimer, the term of this patent is extended or adjusted under 35 U.S.C. 154(b) by 31 days.

(21) Appl. No.: 15/582,951

(22) Filed: May 1, 2017

(65) Prior Publication Data

US 2017/0346385 A1  Nov. 30, 2017

Related U.S. Application Data

(60) Provisional application No. 62/340,668, filed on May 24, 2016.

(51) Int. Cl.
*H02M 1/084* (2006.01)
*H02M 3/156* (2006.01)
(Continued)

(52) U.S. Cl.
CPC ............ *H02M 1/084* (2013.01); *H02M 3/156* (2013.01); *H02M 3/158* (2013.01); *H02M 2001/0009* (2013.01)

(58) Field of Classification Search
CPC ...... H02M 1/084; H02M 3/156; H02M 3/158; H02M 2001/0009
(Continued)

(56) References Cited

U.S. PATENT DOCUMENTS 5,568,044 A * 10/1996 Bittner ................. H02M 3/156
                                                   323/224
6,982,574 B2 * 1/2006 Harriman ............ H02M 3/1588
                                                   327/108
(Continued)

OTHER PUBLICATIONS

Received STIC search report from EIC 2800 searcher John DiGeronimo dated Sep. 6, 2018 for claim 22.*
(Continued)

*Primary Examiner* — Shawki S Ismail
*Assistant Examiner* — Htet Z Kyaw
(74) *Attorney, Agent, or Firm* — Polansky & Associates, P.L.L.C.; Paul J. Polansky (57) ABSTRACT

A switch mode power supply controller includes a switch terminal adapted to be coupled to an inductor that drives a load, high- and low-side switches a pulse width modulation (PWM) circuit, and a current monitor circuit. The PWM circuit is coupled to a feedback terminal for receiving a feedback signal, and alternatively drives the high-side switch and the low-side switch with a duty cycle set using the feedback signal to regulate an output voltage to a desired level in a work mode, and keeps both the high-side switch and the low-side switch non-conductive in a non-work mode. The current monitor circuit provides a current monitor signal representative of a current driven from the inductor to the load, wherein the current monitor circuit forms the current monitor signal by measuring an inductor current during a work mode, and by emulating the inductor current during a non-work mode.

20 Claims, 9 Drawing Sheets

(51) Int. Cl.
  *H02M 3/158* (2006.01)
  *H02M 1/00* (2006.01)

(58) Field of Classification Search
  USPC .......................................... 323/272, 282–288
  See application file for complete search history.

(56) References Cited

U.S. PATENT DOCUMENTS

| | | | | |
|---|---|---|---|---|
| 7,936,160 B1* | 5/2011 | Sheehan | ............... | H02M 3/156 323/222 |
| 8,180,617 B1* | 5/2012 | Klee | ..................... | G06F 19/704 702/19 |
| 8,513,933 B2* | 8/2013 | Notman | ............... | H02M 3/1588 323/284 |
| 9,496,852 B2* | 11/2016 | Nene | ..................... | H02M 3/158 |
| 9,660,516 B2* | 5/2017 | Fogg | ................... | H02M 3/1588 |
| 9,774,253 B2* | 9/2017 | Xu | ........................ | H02M 3/156 |
| 9,853,548 B1* | 12/2017 | Zhang | .................... | H02M 3/158 |
| 2007/0279819 A1* | 12/2007 | Schopfer | ................. | H02M 1/32 361/93.1 |
| 2008/0024213 A1* | 1/2008 | Magrath | ................. | H03F 1/305 330/96 |
| 2008/0088289 A1* | 4/2008 | Fogg | ..................... | H02M 3/156 323/283 |
| 2008/0174286 A1* | 7/2008 | Chu | .................... | H02M 3/1588 323/271 |
| 2008/0231247 A1* | 9/2008 | Uehara | ................. | H02M 3/158 323/284 |
| 2009/0040796 A1* | 2/2009 | Lalithambika | .... | H02M 3/33507 363/21.17 |
| 2009/0273326 A1* | 11/2009 | Lipcsei | ............... | H02M 3/1588 323/282 |
| 2009/0284232 A1* | 11/2009 | Zhang | ...................... | G05F 1/67 322/89 |
| 2010/0213911 A1* | 8/2010 | Oki | ...................... | H02M 3/156 323/283 |
| 2011/0018516 A1* | 1/2011 | Notman | ............... | H02M 3/1588 323/284 |
| 2011/0241633 A1* | 10/2011 | Herzer | ................... | H02M 3/157 323/271 |
| 2012/0319662 A1* | 12/2012 | Kung | ................... | H02M 3/1588 323/271 |
| 2013/0124134 A1* | 5/2013 | Gohel | ..................... | H03K 5/01 702/120 |
| 2013/0314062 A1* | 11/2013 | Notman | ............... | H02M 3/1588 323/271 |
| 2014/0119078 A1* | 5/2014 | Walters | ............... | H02M 1/4225 363/89 |
| 2014/0239925 A1* | 8/2014 | Tanabe | ................ | H02M 3/1582 323/271 |
| 2014/0300326 A1* | 10/2014 | Yang | ..................... | H02J 7/0052 320/162 |
| 2015/0028830 A1* | 1/2015 | Chen | .................... | H02M 3/158 323/271 |
| 2015/0222171 A1* | 8/2015 | Nguyen | ................. | H02M 1/08 323/282 |
| 2016/0036326 A1* | 2/2016 | Sreenivas | ............. | H02M 3/158 323/271 |
| 2016/0118916 A1* | 4/2016 | Gohara | ................... | H02P 6/085 318/400.13 |
| 2016/0154037 A1* | 6/2016 | Kasturi | ............ | G01R 19/16538 |
| 2016/0233766 A1* | 8/2016 | Todorov | ............... | H02M 3/1584 |
| 2016/0301307 A1* | 10/2016 | Huang | .................. | H02M 3/156 |
| 2016/0352237 A1* | 12/2016 | Quigley | ............. | H02M 3/33546 |
| 2017/0179810 A1* | 6/2017 | Ryan | .................. | H02M 3/33507 |
| 2017/0219645 A1* | 8/2017 | Cadigan | ............. | G01R 31/2856 |
| 2017/0222561 A1* | 8/2017 | Ivankovic | ......... | H02M 3/33507 |

OTHER PUBLICATIONS

Received STIC search report from EIC 2800 searcher Samir Patel dated Oct. 12, 2017 for claim 1.*

* cited by examiner

INDUCTOR CURRENT EMULATION FOR OUTPUT CURRENT MONITORING

BACKGROUND

1. Field of the Disclosure

The present disclosure relates generally to electrical circuits, and more particularly but not exclusively to output current monitoring.

2. Description of the Background Art

A buck controller system may be employed to convert a high input voltage to a relatively low output voltage, which is delivered to a load. The buck controller system provides sufficient output current to the load to allow the load to properly operate. Some loads, such as a cloud computing server, consume a large amount of output current. If over-current protection or warning systems are not in place, the cloud computing server may receive as much as 200 A, which may damage printed circuit boards or cause other problems. Unfortunately, directly monitoring the amount of current consumed by the server is not possible in many applications.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

An IMON signal is a current that is configured to follow the output current. The IMON signal is indicative of the output current, and may be a fraction of the output current. More particularly, the ratio of the output current to the LION signal may be a fixed number that is referred to as a conversion factor. The ratio of the output current to the IMON signal may be as high as 200,000, for example. Therefore, by monitoring the IMON signal and knowing the conversion factor, the output current can be monitored. For ease of monitoring, the IMON signal may be sunk into an external resistor. By measuring the voltage across the external resistor, the value of the IMON signal may be readily determined using Ohm's law (i.e., I=V/R). Whenever the output current is too high (e.g. 80A) as indicated by the IMON signal, a protection circuit may immediately send out a protection/warning signal to allow the load to be protected.

A buck controller system may operate in work mode or non-work mode. In work mode, the buck controller system modulates a control switch or a pair of control switches in accordance with, for example, a pulse width modulation (PWM) signal to convert a high input voltage to a low output voltage to deliver output current to the load. In non-work mode, which is also referred to as "TRI mode" the modulation is stopped by placing the PWM signal in tri-state. During operation, the buck controller system may switch from work mode to non-work mode, in which case the IMON signal will abruptly change. More particularly, the IMON signal immediately decreases to zero in non-work mode. Because the IMON signal does not follow the output current during non-work mode, a dangerous condition exists wherein the output current may be at a level that is outside the safety range but the IMON signal does not reflect the level of the output current.

To address the above concerns, embodiments of the present invention enable the IMON signal to mimic the output current even when the buck controller system is in non-work mode. This advantageously makes output current monitoring possible, and maintains the same level of safety, regardless of the buck controller system's mode of operation.

In one embodiment, resistance (R) and capacitance (C) are utilized to introduce an RC delay to the IMON signal decay. Instead of dropping to zero immediately in nonwork mode, the IMON signal gradually decays in a manner similar to the decay of the 15 output current. This embodiment is also referred to as "RC decay".

In another embodiment, referred to as "linear decay," discharging current that is linear to the inductor current is utilized to mimic the output current. Instead of dropping immediately to zero when in non-work mode, the IMON signal decays linearly, which is similar to the way the output current decays. By choosing an appropriate discharging resistor, the IMON signal follows the output current decay in linear fashion. As will be more apparent below, the linear decay solution is preferable to the RC decay solution, as the linear decay solution allows the IMON signal to more faith fully resemble the output current decay in non-work mode. However, an RC decay circuit is simpler and consumes less power compared to a linear decay circuit.

Inductor Current Emulation

Figure 1:
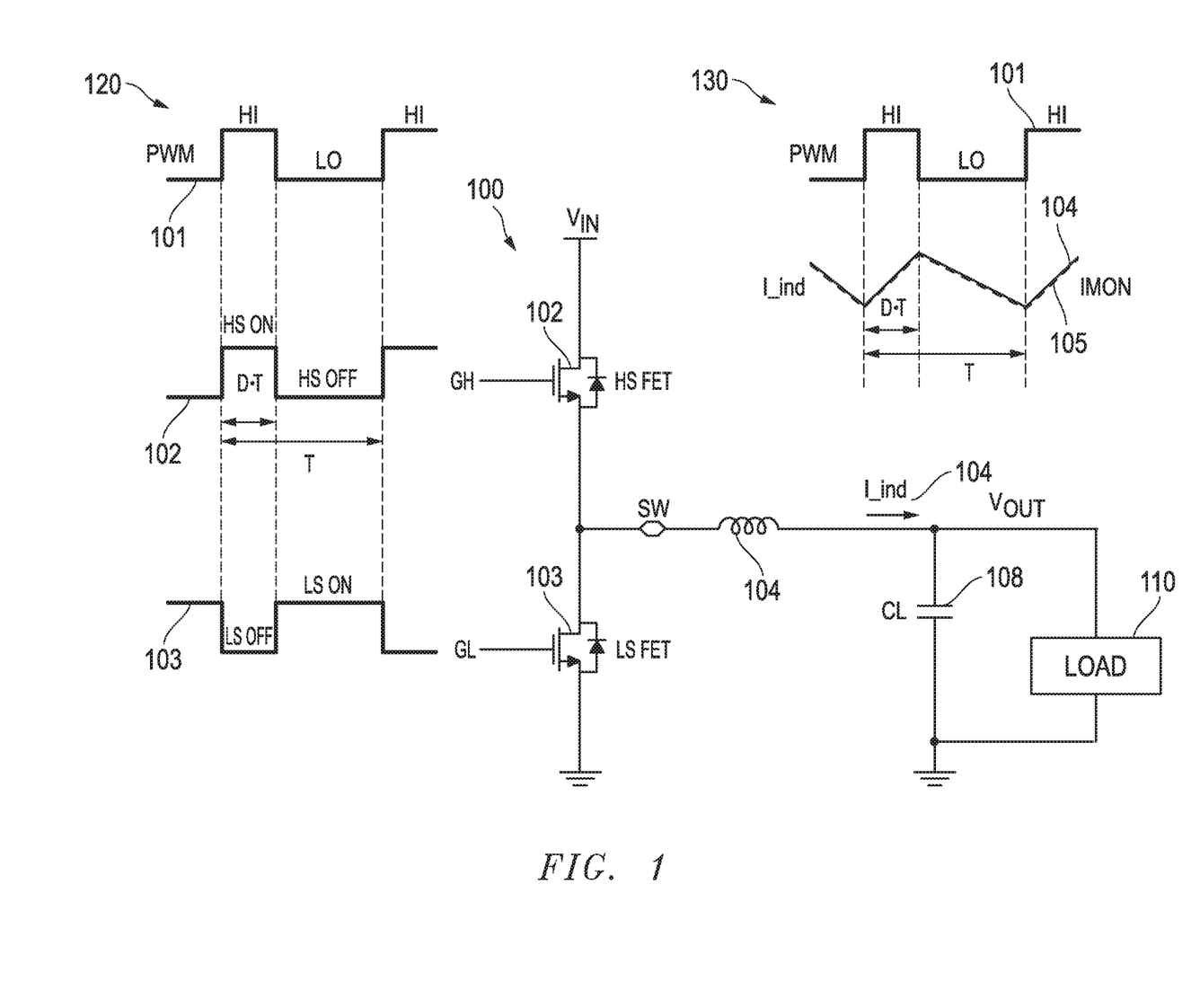
FIG. 1 shows a schematic diagram of a buck controller system in work mode.

FIG. 1 shows a combined schematic and timing diagram of a buck controller system 100. Buck controller system 100 includes a high-side (HS) field effect transistor (ITT) 102 and a low-side (LS) FET 103, an inductor 104 labeled "L," a load capacitor 108 labeled "CL", and a load 110. HS ITT 102 has a drain for receiving an input voltage labeled "VIN", a gate for receiving a gate drive signal labeled "GH", and a source connected to a switch node labeled "SW". LS FET 103 has a drain connected to the source of HS FET 102, a gate for receiving a gate drive signal labeled "GL", and a source connected to ground. Inductor 104 has a first terminal connected to switch node SW, and a second terminal for providing an output voltage labeled. "$V_{OUT}$". Load capacitor 108 has a first terminal connected to the second terminal of inductor 104, and a second terminal connected to ground. Load 110 has a first terminal connected to the second terminal of inductor 104, and a second terminal connected to ground.

The high-side and low-side FETs are driven in accordance with a pulse width modulation (PWM) signal 101, as shown in a timing diagram 120. In timing diagram 120, the horizontal axis represents time in seconds whereas the vertical axis represents the voltage of various signals in volts, although these axes are not shown in FIG. 1 for simplicity. More particularly, high-side FET 102 is driven by a similarly numbered high-side drive signal 102 and low-side FET 103 is driven by a similarly numbered low-side drive signal 103 in accordance with PWM signal 101.

The modulation of the high-side and low-side FETs generates an inductor current labeled "i_ind" 104 through inductor 104, which is shown in a timing diagram 130. In timing diagram 130, the horizontal axis represents time in seconds whereas the vertical axis represents the voltage of various signals in volts, although these axes are not shown in FIG. 1 for simplicity. Inductor current i_ind, which is the output current of buck controller system 100, is delivered to load 110. FIG. 1 shows buck controller system 100 in work mode. Note that in work mode, the IMON signal (signal 105) follows the output current (signal 104), allowing for monitoring of the output current.

Figure 2:
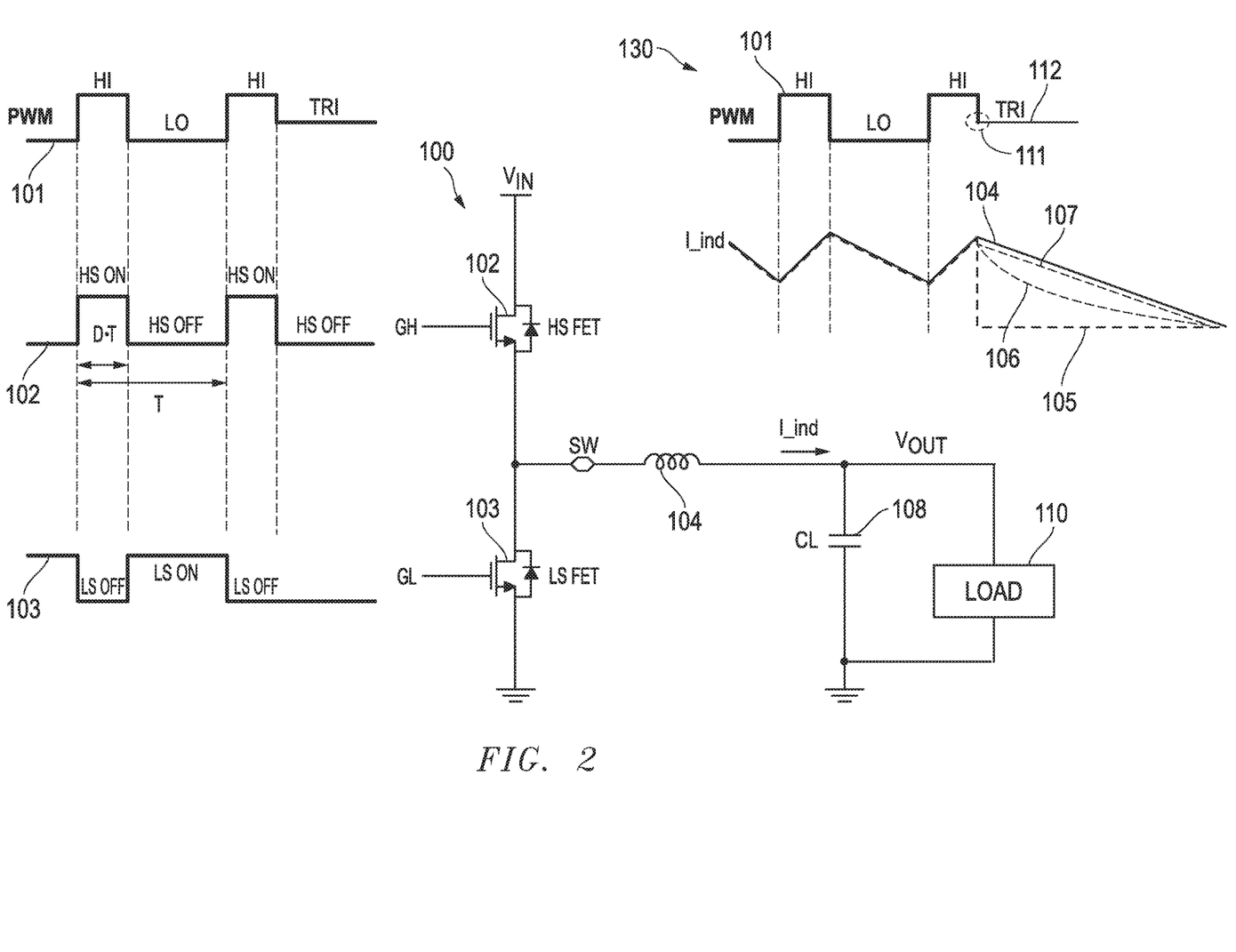
FIG. 2 shows the buck controller system of FIG. 1 transitioning from work mode to non-work mode.

FIG. 2 shows a combined schematic and timing diagram of buck controller system 100 of FIG. 1 transitioning from work mode to non-work mode at a time point 111. In non-work mode, PWM signal 101 is placed in a high-impedance state (segment 112 of signal 101), i.e. a state in which the PWM signal is neither low nor high. FIG. 2 shows the IMON signal when buck controller system 100 does not employ an embodiment of the present invention (signal 105), when buck controller system 100 employs an RC delay circuit to control the decay of the IMON signal (signal 106), and when buck controller system 100 employs a linear decay circuit to control the decay of the IMON signal (signal 107). Note that in non-work mode, without taking advantage of embodiments of the present invention, the IMON signal immediately stops following the output current (signal 104). According to embodiments of the present invention (signals 106 and 107), buck controller system 100 advantageously enables the IMON signal to decay with the output current (signal 104).

Figure 3:
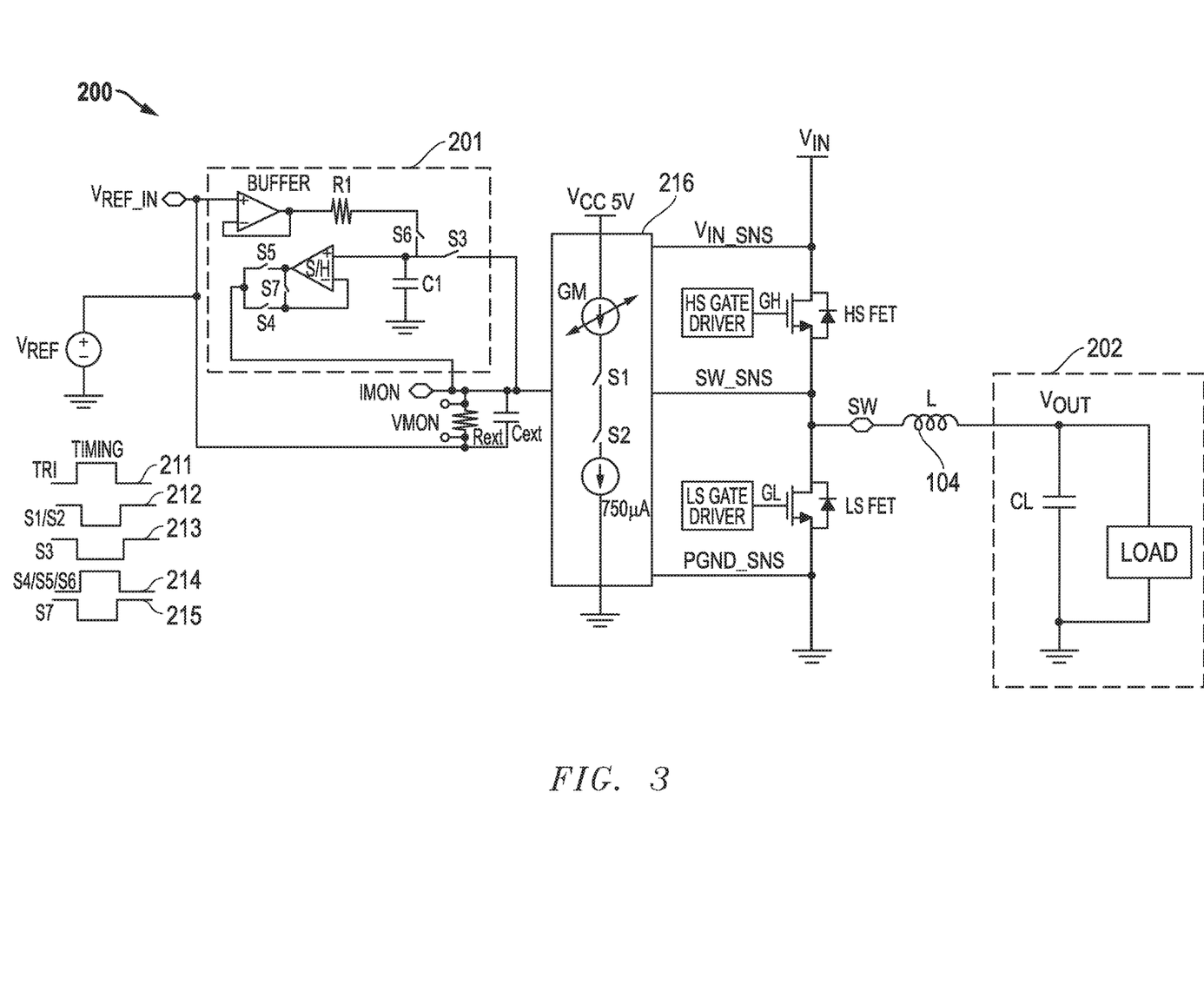
FIG. 3 shows a buck controller system in accordance with an embodiment of the present invention.

FIG. 3 shows a buck controller system 200 in accordance with an embodiment of the present invention. Similar to buck controller system 100 of FIG. 1, buck controller system 200 includes an output stage 202, a high-side FET, a low-side FET and an output inductor L.

In the example of FIG. 3, the IMON signal generated by the IMON generator 216 in work mode is sunk on an external resistor Rext, thereby developing a voltage signal labeled "VMON" that is developed on an IMON node with respect to a reference voltage. The VMON signal, just like the IMON signal, is thus indicative of the output current. Buck controller system 200 further includes an RC decay circuit 201 for controlling the decay of the IMON signal to follow the decay of the output current in non-work mode, which in this example is when the PWM signal is placed in high impedance state. More particularly, in the example of FIG. 3, the VMON voltage decays by an R1 C1 time constant as follows:

$$V_{mon} = V_{ref}\left(1 - e^{\frac{-t}{R1 \cdot C1}}\right) - V_{ref} \qquad (1)$$

The voltage Vref is a biasing voltage that is selected to ensure that the IMON generator 216 can function correctly. At the same time, the voltage Vref is kept as low as possible to ensure that it is adaptive to a lower the supply voltage VCC in different applications. Lowering down the voltage Vref will reduce the overall power consumption as well.

FIG. 3 also shows a state timing diagram of the TRI mode (plot 211), switches S1 and S2 (plot 212), switch S3 (plot 213), switches S4, S5, and S6 (plot 214), and switch S7 (plot 215). In the timing diagram, the horizontal axis represents time in seconds whereas the vertical axis represents the voltage of various signals in volts, although these axes are not shown in FIG. 3 for simplicity.

In the example of FIG. 3, IMON generator 216 provides the IMON signal when the switches S1 and S2 are turned ON. Otherwise, when the switches S1 and S2 are turned OFF, the IMON generator 216 behaves as a high resistance block, i.e., no current flows in or out of IMON generator 216.

In the illustrated embodiment, IMON generator 216 detects the voltage across the high-side PET to detect the inductor current through the inductor L when the high-side FET is ON (and the low-side FET is OFF). For example, the RDSON of the high-side FET may be scaled such that the voltage across the high-side FET is representative of the inductor current. The IMON generator 216 similarly detects the inductor current from the voltage across the low-side FET when the low-side FET is ON and the high-side PET is OFF). IMON generator 216 may be implemented using current mirrors, transconductance amplifiers, etc., for example.

Referring to FIG. 3, in a first step, the TRI mode (i.e., non-work mode) is entered by the TRI signal going high. In response, switches S4/S5/S6 are switched ON, and reference Vref is sampled and held by the buffer and a sample-and-hold (S/H) block. Delay is introduced by the resistor R1 and the capacitor C1. The IMON node voltage, VMON, will approach Vref with R1'C1 time constant. Therefore, the VMON voltage drops to zero gradually, and the IMON signal diminishes to zero gradually.

In a second step, the TRI mode is exited by the TRI signal going low. In response, switches S4/S5/S6 are switched OFF. The IMON signal is no longer controlled by the S/H block, but functions as part of the buck controller system loop independently.

Figure 4:
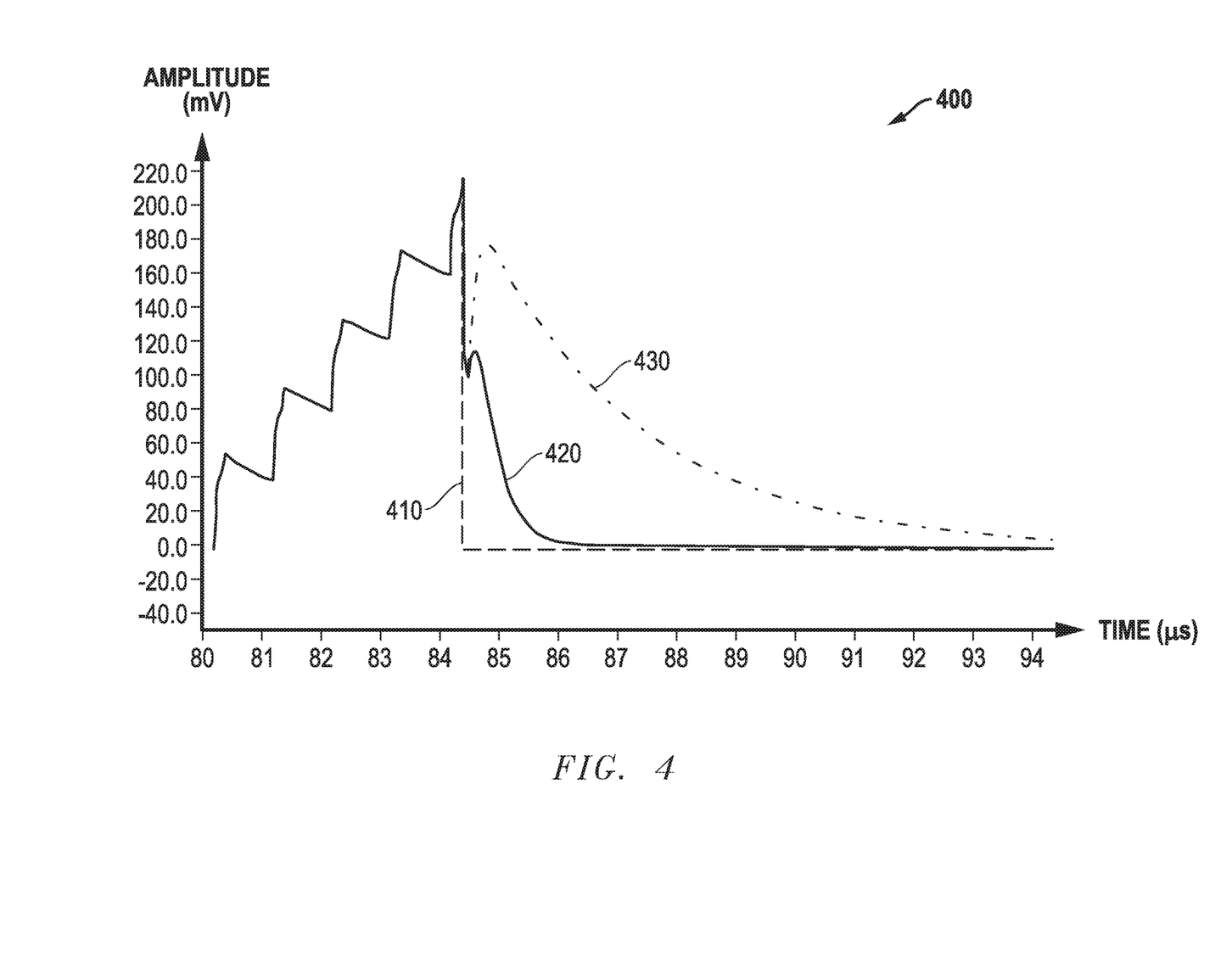
FIG. 4 shows a timing diagram of simulation results of the buck controller system of FIG. 3.

FIG. 4 shows a timing diagram 400 of buck controller system 200. In timing diagram 400, the horizontal axis represents time in microseconds (μsec) whereas the vertical axis represents the voltage of various signals in volts. FIG. 4 shows a simulation in which buck controller system 200 is in work mode and then enters non-work mode. A buck controller system without monitor current emulation is shown by a waveform 410. In waveform 410, IMON decays to 0 substantially immediately and remain at 0, Waveform 420 shows buck controller system 200 with monitor current emulation using a first RC time constant. In this example, R1 is set to 40 kΩ, and C1 is set to 10 picofarads (pF), and waveform 420 decays to 0 in about 2 μsec. Waveform 430 shows buck controller system 200 with monitor current emulation using a second RC time constant, in which R1 is set to 250 kΩ, and C1 is set to 10 pF, and waveform 430 decays to 0 in about 12 μsec. Thus buck controller system 200 can use RC emulation to better approximate the actual rolloff of current, but are the expense of larger components.

Figure 5:
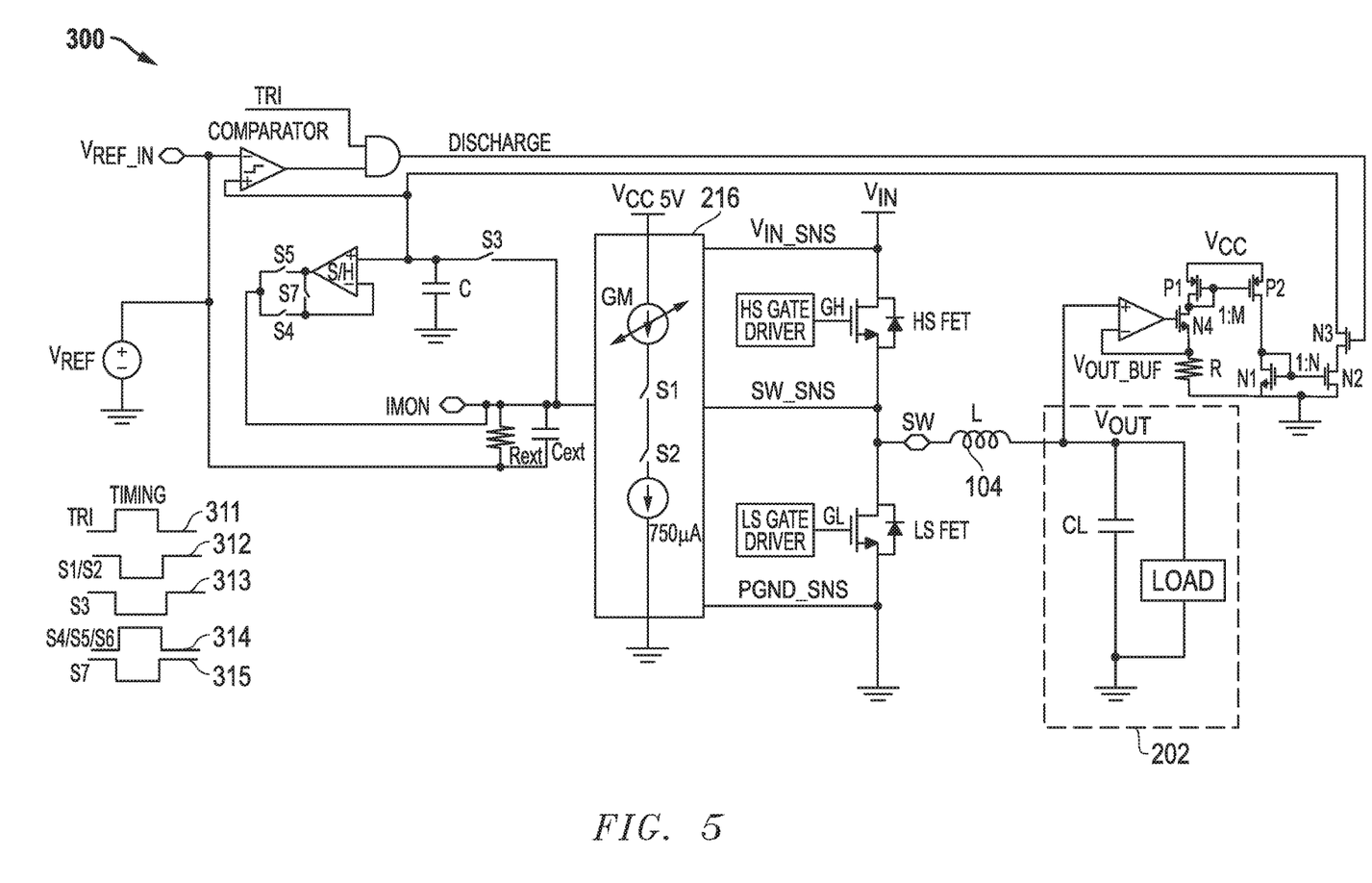
FIG. 5 shows a schematic diagram of a buck controller system in accordance with an embodiment of the present invention.

FIG. 5 shows a combined schematic and timing diagram of a buck controller system 300 in accordance with an embodiment of the present invention. Similar to the buck controller system 100 of FIG. 1, buck controller system 300 includes an output stage having a high-side FET, a low-side FET, and an output inductor L.

In the example of FIG. 5, the IMON signal is sunk on an external resistor REXT, developing a VMON voltage on an IMON node. The VMON voltage, just like the IMON is thus indicative of the output current. Buck controller system 300 further includes a linear decay circuit for controlling decay of the IMON signal to follow the decay of the output current in non-work mode, which in this example is when the PWM signal is placed in a high impedance state.

In the example of FIG. 5, in non-work mode, the node Vout_buf follows the output voltage $V_{OUT}$, which is reflected by the current through the resistor R. This current is mirrored twice through the transistors P1 and P2 and transistors N1 and N2, and then determines the current discharging VMON. The VMON voltage is linearly dropping down, and so is the IMON signal, based on discharging capacitor C using a constant current scaled according to the value of $V_{OUT}$.

In the example of FIG. 5, when the buck controller system goes into TRI mode (i.e., non-work mode), both of the high-side and low-side FETs are turned OFF, but the VMON voltage at that moment is sampled and held right before the TRI mode as in the buck controller system 200 of FIG. 3. Then, the VMON voltage will decay from the held value to zero with the constant/linear current flowing through the transistors N3 and N2, until the absolute value of the VMON voltage is equal to VREF_IN (VMON=0). The linear decay of the VMON voltage may be described as follows.

Vmon Linear Decay

The charge on the capacitor is described as below:

$$Q = Cext \cdot Vmon = I_b \cdot t \quad (1)$$

Since $$I_b = M \cdot N \cdot \frac{Vout\_buf}{R}, \quad (2)$$

At the same time, $$t = \frac{i\_ind \cdot L}{Vout\_buf} \quad (3)$$

And $$Vmon = i\_ind \cdot gain_{V_{mon}} \quad (4)$$

Combining equations (1)-(4), $$t = \frac{i\_ind \cdot L}{Vout\_buf} = \frac{cext \cdot gainVmon \cdot i\_ind}{M \cdot N \cdot \frac{Vout\_buf}{R}} \quad (5)$$

According to (5), we can deduce $$R = \frac{L \cdot M \cdot N}{Cext \cdot gainVmon} \quad (6)$$

With the R configured as equation (6) shows, we can achieve a linear drop of Vmon as:

$$Vmon = \frac{M \cdot N \cdot i\_ind \cdot L}{R \cdot Cext} \quad (7)$$

For a particular design, M, N, and $gain_{V_{mon}}$ in equation (6) above are fixed parameters, whereas $C_{ext}$ and L are variable parameters determined by the user or specific application. An optional pin for the external resistor R in (6) may be provided, so that R is set accordingly for different values of $C_{ext}$ and L.

WORKING EXAMPLES

Figure 6:
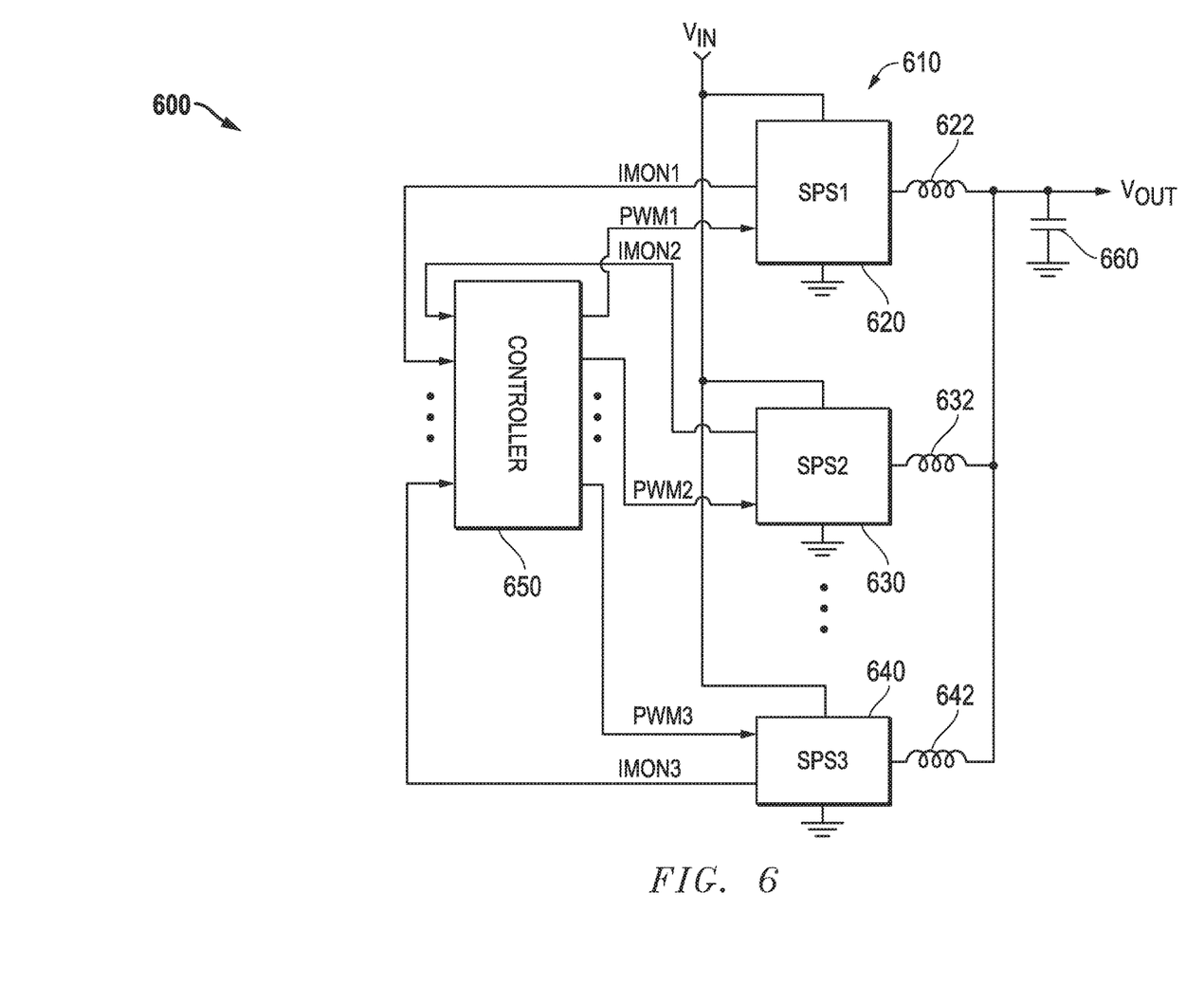
FIG. 6 shows a partial block diagram and partial schematic of a multi-phase buck controller system in accordance with another embodiment of the present invention.

FIG. 6 shows a partial block diagram and partial schematic of a multi-phase buck controller system 600 in accordance with another embodiment of the present invention. Multi-phase buck controller system 600 generally includes a set of phase controllers 610, a controller 650, and an output capacitor 660.

Phase controllers 610 include an arbitrary number of N phase controllers, including representative phase controllers 620, 630, and 640 labeled "SPS1", "SPS2", and "SPSN" corresponding to phases 1, 2, and N, respectively. Each phase controller has a voltage input terminal for receiving input voltage $V_{IN}$, a voltage output terminal, a ground terminal connected to ground, an enable input terminal for receiving a respective one of a set of enable signals labeled "PWM1", "PWM2", and "PWMN", and a monitor output terminal for providing a respective one of monitor signals libeled signal labeled "IMON1", "IMON2", and "IMON3". In the exemplary embodiment shown in FIG. 6, each phase controller is a separate integrated circuit.

Phase controller 620 has an associated inductor 622 having a first terminal connected to the output terminal of phase controller 620, and a second terminal. Phase controller 630 has an associated inductor 632 having a first terminal connected to the output terminal of phase controller 630, and a second terminal. Phase controller 640 has an associated inductor 642 having a first terminal connected to the output terminal of phase controller 640, and a second terminal. The second terminals of all such associated inductors are connected in common to provide output voltage $V_{OUT}$. Controller 650 has input terminals connected to the monitor output terminals of phase controllers 620, 630, and 640, and output terminals connected to the enable input terminals of phase controllers 620, 630, and 640, respectively. Capacitor 660 has a first terminal connected to the second terminals of all the associated inductors, and a second terminal connected to ground.

In operation, multi-phase buck controller system 600 is useful in applications such as computer servers that require a large amount of current in steady state, such as 200 amperes (A). Controller 650 activates a number of phases that correspond to the amount of current required. For example in an 8-phase system in which each phase is capable of outputting 50 A, all eight phases would be enabled if the load required 200 A, but only four phases would be enabled if the load required only 100 A. Note that FIG. 6 does not show conventional voltage and current feedback loops and fault detection mechanisms that will typically be present but that are not important to understanding the operation of the current monitor function.

Because of the large amount of current flowing into the load, it is not feasible to measure the load current directly. In this architecture, each phase controller provides a current monitor signal IMON that corresponds to the current that it provides into the load through its associated inductor, and controller 650 sums the current monitor signals to measure the overall current into the load. If the overall current into the load is too high, controller 650 can shutdown the system, either temporarily or permanently, to prevent component damage.

In known multi-phase architectures, the monitor current does not take into account the current from inactivated phases. However in accordance with the embodiments disclosed herein, each phase controller provides to controller 650 a current monitor signal that represents not only the current being provided when the phase is active in its "work mode", but also the current provided after the phase has been disabled in its "non-work" mode. In this way, controller 650 can more accurately determine the total amount of current required by the load at any point in time, and thus can make better decisions about when to activate or inactivate phases and when to shutdown the system because of an overcurrent condition. The specific operation of the phase controllers will now be described.

Figure 7:
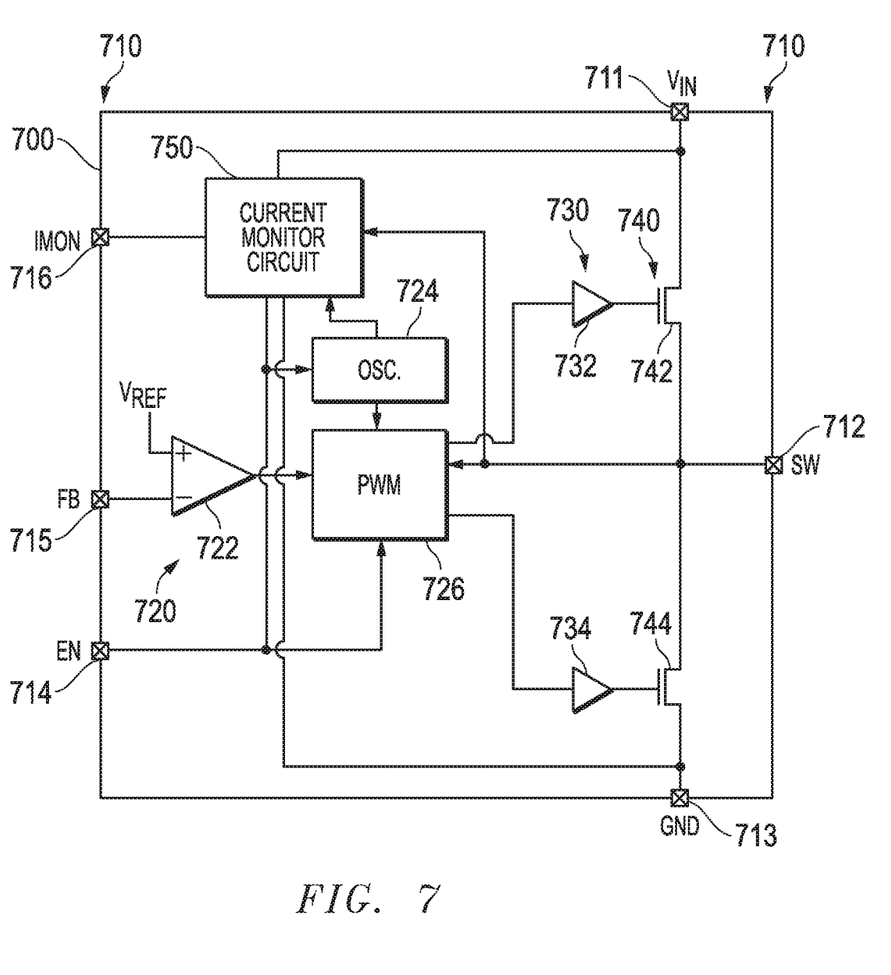
FIG. 7 shows a partial block diagram and partial schematic of a phase controller useful in the multi-phase buck controller system of FIG. 6.

FIG. 7 shows a partial block diagram and partial schematic of a phase controller 700 useful in multi-phase buck controller system 600 of FIG. 6. Phase controller 700 is an integrated circuit (IC) having a set of terminals 710, a PWM controller 720, a driver stage 730, and output stage 740, and a current monitor circuit 750. Terminals 710 include a voltage input terminal 711 labeled "$V_{IN}$", an output terminal 712 labeled "SW", a ground terminal 713 labeled "GND", an enable terminal 714 labeled "EN", a feedback terminal 715 labeled "FB", and a current monitor terminal 716 labeled "IMON".

PWM controller 720 includes an error amplifier 722, an oscillator 724, and a PWM logic circuit 726. Error amplifier 722 has a non-inverting input for receiving a reference voltage labeled "$V_{REF}$", an inverting input connected to feedback terminal 715, and an output. Oscillator 724 has an input connected to enable terminal 714, a first output for providing a clock signal and a set of phase signals, and a second output for providing the clock signal and an oscillator ramp signal. PWM logic circuit 726 has a control input connected to enable terminal 714, an input connected to the output of error amplifier 722, an input connected to the second output of oscillator 724, a switch input connected to output terminal 712, a high-side switch output, and a low-side switch output.

Driver stage 730 includes drivers 732 and 734. Driver 732 has an input connected to the high-side switch output of PWM logic circuit 726, and an output. Driver 734 has an input connected to the low-side switch output of PWM logic circuit 726, and an output.

Output stage 740 includes N-channel MOS transistors 742 and 744. Transistor 742 has a drain connected to voltage input terminal 711, a gate connected to the output of driver 732, and a source connected to output terminal 712. Transistor 744 has a drain connected to output terminal 712, a gate connected to the output of driver 734, and a source connected to ground terminal 713.

Current monitor circuit 750 has inputs connected to terminals 711, 712, and 713, an optional enable input connected to enable terminal 714, an input connected to the first output of oscillator 724, and an output connected to current monitor terminal 716.

In a work mode when the enable signal is active, PWM controller 720 provides conventional voltage-mode PWM control by developing an error signal by comparing a feedback signal to a reference voltage. Multi-phase buck controller system 600 generates the feedback signal as a fraction of output voltage $V_{OUT}$. Error amplifier 722 compares the feedback signal to $V_{REF}$ and generates a signal proportional to the difference. In voltage mode control, there will also typically be a compensation network connected to the output terminal of error amplifier 722, but this detail is not shown in FIG. 6. PWM logic circuit 726 generates the high-side and low-side switch signals by comparing the ramp signal generated by oscillator 724 to the compensated error signal. PWM logic circuit 726 makes the high-side switch active and the low-side switch inactive at the beginning of each oscillator cycle. PWM logic circuit 726 makes the high-side switch inactive and the low-side switch active when the oscillator ramp signal exceeds the compensated error signal. In some embodiments, oscillator 724 also provides a maximum duty cycle signal to PWM logic circuit 726 to limit the duty cycle to a certain maximum value. In the work mode, current monitor circuit 750 determines the value of IMON by measuring the current through transistors 742 and 744 as described above.

In a non-work mode, PWM logic circuit 726 keeps both the high-side and low-side switch signals inactive. Current monitor circuit 750 determines the value of IMON by emulating the inductor current in a manner described above and described further below.

Figure 8:
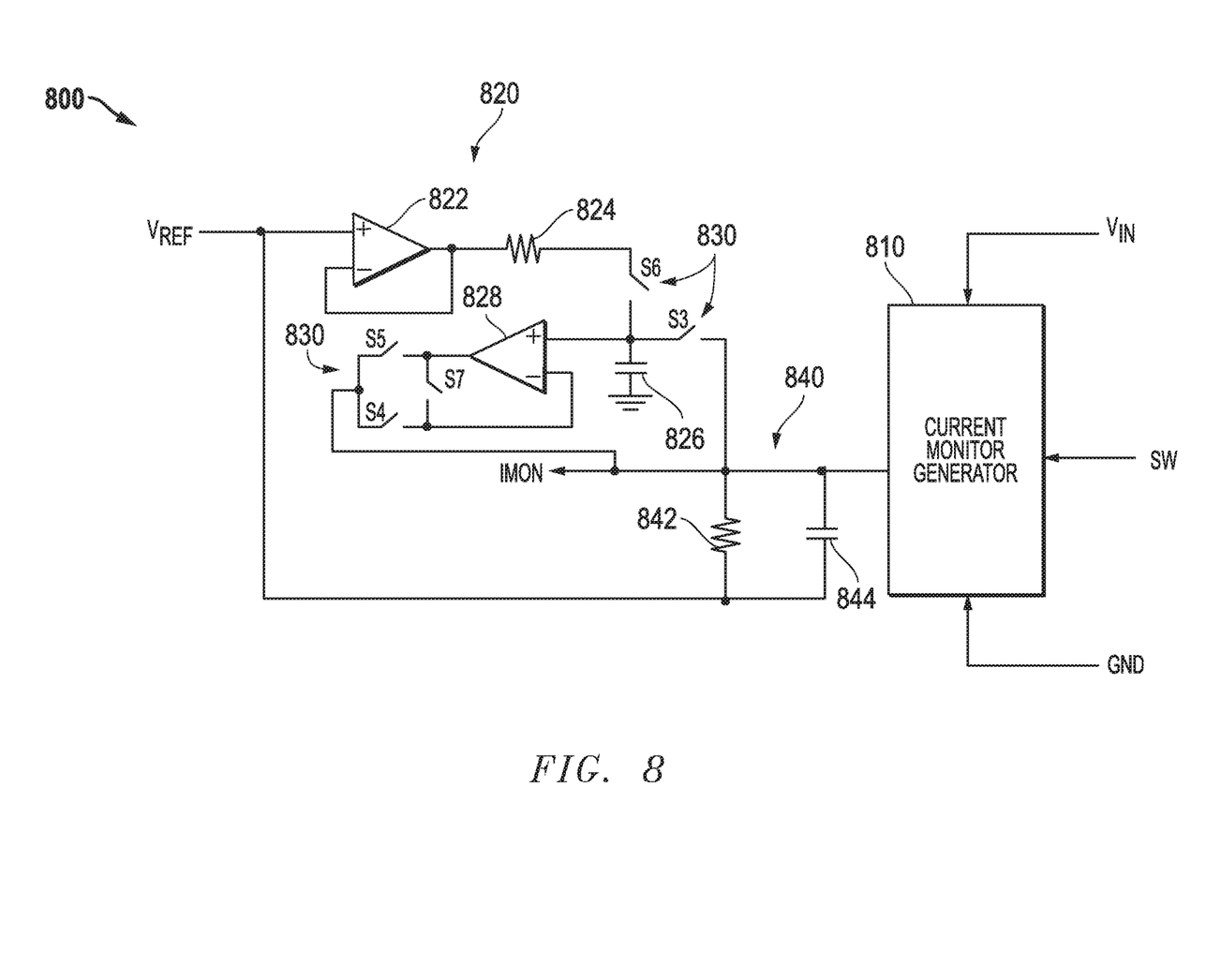
FIG. 8 shows a partial block diagram and partial schematic of one embodiment of a current monitor circuit according to one embodiment of the current monitor circuit of the phase controller FIG. 7.

FIG. 8 shows a partial block diagram and partial schematic of a current monitor circuit 800 according to one embodiment of the current monitor circuit 750 of phase controller 700 of FIG. 7. Current monitor circuit 800 includes generally a current monitor generator 810, an RC decay circuit 820, and an IMON generator 840.

Current monitor circuit 810 has inputs for receiving the $V_{IN}$, SW, and GND signals, and a monitor current output. RC decay circuit 820 includes an amplifier 822, a resistor 824, a capacitor 826, and an amplifier 828 and a set of switches 830. Amplifier 822 has a non-inverting input for receiving $V_{REF}$, an inverting input, and an output connected to the inverting input thereof. Resistor 824 has a first terminal connected to the output of amplifier 822, and a second terminal. Capacitor 826 has a first terminal, and a second terminal connected to ground. Amplifier 828 has a non-inverting input connected to the first terminal of capacitor 826, an inverting input, and an output. Switches 830 are controlled by switch signals as discussed above, including a switch that connects the first terminal of capacitor 826 to the IMON output terminal according to the state of signal S3, a switch that connects the inverting input of amplifier 828 to the IMON output terminal according to the state of signal S4, a switch that connects the output of amplifier 828 to the IMON output terminal according to the state of signal S5, a switch that connects the second terminal of resistor 824 to the first terminal of capacitor 826 according to the state of signal S6, and a switch that connects the output of amplifier 828 to the inverting input thereof according to the state of signal S7.

IMON generator 840 includes a resistor 842 and a capacitor 844. Resistor 842 has a first terminal connected to the output of current monitor generator 810, and a second terminal connected to ground. Capacitor 844 has a first terminal connected to the output of current monitor generator 810 and to the first terminal of resistor 842, and a second terminal connected to ground.

In operation, in work mode, the value of the current is determined by the level measured by current monitor generator 810. Switch S3 connects the IMON output terminal to the first terminal of capacitor 826, which continuously samples the IMON value. Switches S4 and S5 disconnect the output of amplifier 828 from the IMON terminal, and switch S7 connected the output of amplifier 828 to the inverting input thereof, allowing the output to follow the voltage at the first terminal of capacitor 826.

When transitioning from work mode to non-work mode, switch S3 opens, causing the value on the first terminal of capacitor 826 to hold the value of IMON at the beginning of non-work mode. Switches S4 and S5 close and switch S7 opens, causing amplifier 828 to be configured as a voltage follower to drive the voltage on the first terminal of capacitor 826 onto the IMON node. Switch S6 also closes, causing the voltage on the IMON node to decay according to an RC time constant established by the value of resistor 824 (R1) and the value of capacitor 826 (C1) as described above.

Figure 9:
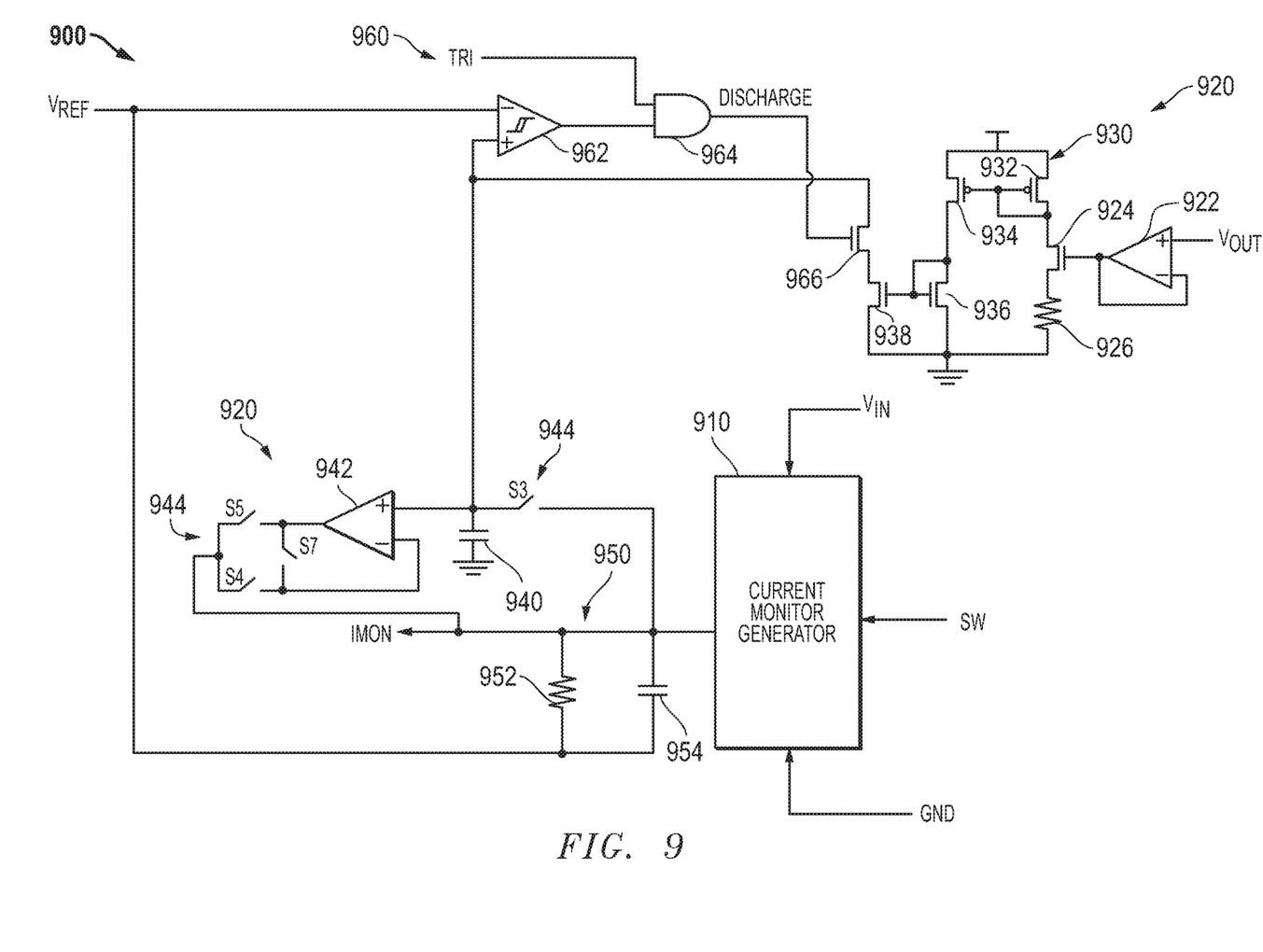
FIG. 9 shows a partial block diagram and partial schematic of a current monitor circuit according to one embodiment of the current monitor circuit of the phase controller of FIG. 7.

FIG. 9 shows a partial block diagram and partial schematic of a current monitor circuit 900 according to one embodiment of the current monitor circuit 750 of phase controller 700 of FIG. 7. Current monitor circuit 900 includes generally a current monitor generator 910, a linear decay circuit 920, an IMON generator 950, and a disable circuit 960.

Current monitor circuit 910 has inputs for receiving the $V_{IN}$, SW, and GND signals, and a monitor current output terminal. Linear decay circuit 920 includes generally an amplifier 922, an N-channel MOS transistor 924, a resistor 926, a current mirror circuit 930, a capacitor 940, an amplifier 942, and a set of switches 944. Amplifier 922 has a non-inverting input for receiving $V_{OUT}$, an inverting input, and an output connected to the inverting input thereof. Transistor 924 has a drain, a gate connected to the output of amplifier 922, and a source. Resistor 926 has a first terminal connected to the drain of transistor 924, and a second terminal connected to ground.

Current mirror circuit 930 includes P-channel transistors 932 and 934, and N-channel transistors 936 and 938. Transistor 932 has a source connected to a power supply voltage terminal labeled "$V_{CC}$", a gate and a drain connected to the gate thereof and to the drain of transistor 924. $V_{CC}$ is a stable internal power supply voltage derived from VIN. Transistor 934 has a source connected to $V_{CC}$, a gate connected to the drain of transistor 932, and a drain. Transistor 936 has a drain connected to the drain of transistor 934, a gate connected to the drains of transistors 934 and 936, and a source connected to ground. Transistor 938 has a drain, a gate connected to the drain of transistor 936, and a source connected to ground.

Capacitor 940 has a first terminal, and a second terminal connected to ground. Amplifier 942 has a non-inverting input connected to the first terminal of capacitor 940, an inverting input, and an output. Switches 944 are controlled by switch signals as discussed above, including a switch that connects the first terminal of capacitor 940 to the IMON output terminal according to the state of signal S3, a switch that connects the inverting input of amplifier 942 to the IMON output terminal according to the state of signal S4, a switch that connects the output of amplifier 942 to the IMON output terminal according to the state of signal S5, and a switch that connects the output of amplifier 942 to the inverting input thereof according to the state of signal S7.

IMON generator 950 includes a resistor 952 and a capacitor 954. Resistor 952 has a first terminal connected to the output of current monitor generator 910, and a second terminal connected to ground. Capacitor 954 has a first terminal connected to the output of current monitor generator 910 and to the first terminal of resistor 952, and a second terminal connected to ground.

Disable circuit 960 includes a comparator 962, an AND gate 964, and an N-channel transistor 966. Comparator 962 has a non-inverting input connected to the first terminal of capacitor 940, an inverting input terminal and an output terminal. AND gate 964 has a first input for receiving the TRI signal, a second input connected to the output of comparator 962, and an output. Transistor 966 has a drain connected to the first terminal of capacitor 940 and to the non-inverting input of comparator 962, a gate connected to the output of AND gate 964, and a source connected to the drain of transistor 938.

In operation, in a work mode, the value of the current is determined by the level measured by current monitor generator 910. Switch S3 connects the IMON output terminal to the first terminal of capacitor 940 which continuously samples the IMON value. Switches S4 and S5 are open and disconnect the output of amplifier 942 from the IMON terminal, and switch S7 is closed to connect the output of amplifier 828 to the inverting input thereof, allowing the output to follow the voltage at the first terminal of capacitor 940. In work mode, signal TRI is low, and the DISCHARGE signal is likewise low, keeping transistor 966 non-conductive.

When transitioning from work mode to non-work mode, switch S3 opens, causing the value on the first terminal of capacitor 940 to reflect the value of IMON at the beginning of non-work mode. Switches S4 and S5 close and switch S7 opens, causing amplifier 942 to be configured as a voltage follower to drive the voltage on the first terminal of capacitor 940 onto the IMON node. The TRI signal goes active in non-work mode, and the value of IMON at the beginning of non-work mode is above VREF, this causing the output of comparator 962 to go high. Since both inputs of AND gate 964 are high, AND gate 964 activates the DISCHARGE signal at a logic high. The activation of the DISCHARGE signal causes transistor 966 to become conductive, and to sink a current from the first terminal of capacitor 940 that is proportional to $V_{OUT}$ as determined by the value of $V_{OUT}$, the value of resistor 926 and the ratios of the P- and N-channel current mirrors (M and N, respectively). In work mode when the voltage at the first terminal of capacitor 940 falls below $V_{REF}$ minus a hysteretic amount, then the discharge path is disabled until the controller phase is again placed in work mode and the value at the first terminal of capacitor 940 rises above $V_{REF}$ plus a hysteretic amount.

Current monitor circuits 800 and 900 provide two alternative embodiments that each may be appropriate in some circumstances. Current monitor circuit 800 provides a simpler circuit and may be appropriate for lower cost designs to emulate the IMON decay. Current monitor circuit 900 provides a more accurate emulation of the IMON decay but requires more circuit area.

While specific embodiments of the present invention have been provided, it is to be understood that these embodiments are for illustration purposes and not limiting. Many additional embodiments will be apparent to persons of ordinary skill in the art reading this disclosure.

The above-disclosed subject matter is to be considered illustrative, and not restrictive, and the appended claims are intended to cover all such modifications, enhancements, and other embodiments that fall within the true scope of the claims. For example, the number of phases will vary depending on the particular application. Furthermore in some embodiments, smaller circuit area and lower cost will be preferred to better accuracy, leading to the use of the RC decay circuit, whereas in other embodiments better accuracy will be preferred, leading to the use of the linear decay circuit. Moreover, the current switching limitations of each phase controller and of the overall power supply will vary based on the characteristics of the particular manufacturing technologies used. Furthermore, the phase controllers can implement a variety of known loop control and protection techniques in conjunction with the basic PWM voltage mode control described above.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A switch mode power supply controller, comprising:
   a switch terminal adapted to be coupled to an inductor that drives a load;
   a high-side switch coupled between an input voltage terminal and said switch terminal;
   a low-side switch coupled between said switch terminal and a ground voltage terminal;
   a pulse width modulation circuit coupled to a feedback terminal for receiving a feedback signal, wherein the pulse width modulation circuit alternatively drives said high-side switch and said low-side switch with a duty cycle set using said feedback signal to regulate an output voltage to a desired level in a work mode, and keeps both said high-side switch and said low-side switch non-conductive in a non-work mode regardless of a value of said feedback signal, wherein said pulse width modulation circuit is disabled in said non-work mode; and
   a current monitor circuit for providing a current monitor signal representative of a current driven from said inductor to said load, wherein said current monitor circuit forms said current monitor signal by measuring an inductor current during said work mode, and by emulating said inductor current by controlling a decay of said current monitor signal to follow said inductor current during said non-work mode.

2. The switch mode power supply controller of claim 1, wherein said current monitor circuit emulates said inductor current using an RC decay during said non-work mode.

3. The switch mode power supply controller of claim 2, wherein said current monitor circuit comprises:
   a current monitor generator for providing said current monitor signal proportional to a measured current flowing through said high-side switch and said low-side switch during said work mode;
   an RC decay circuit for decreasing said current monitor signal at a beginning of said non-work mode according to an RC decay that approximates said current from said inductor into a predetermined load during said non-work mode; and
   an output impedance having a first terminal for receiving said current monitor signal, and a second terminal for receiving a reference voltage.

4. The switch mode power supply controller of claim 3, wherein said RC decay circuit comprises:
   a resistor having a first terminal for receiving a buffered reference voltage, and a second terminal;
   a sampling capacitor having a first terminal, and a second terminal coupled to a ground voltage terminal;
   an amplifier having a non-inverting input coupled to said first terminal of said sampling capacitor, an inverting input, and an output; and
   a switch network for coupling said first terminal of said sampling capacitor to said output of said current monitor generator and decoupling said output of said amplifier from said output of said current monitor generator and said second terminal of said resistor from said first terminal of said sampling capacitor in said work mode, and decoupling said first terminal of said sampling capacitor from said output of said current monitor generator and coupling said output of said amplifier to said output of said current monitor generator and said second terminal of said resistor to said first terminal of said sampling capacitor in said non-work mode.

5. The switch mode power supply controller of claim 1, wherein said current monitor circuit emulates said inductor current using a linear decay during said non-work mode.

6. The switch mode power supply controller of claim 5, wherein said current monitor circuit comprises:
   a current monitor generator for providing said current monitor signal proportional to a measured current flowing through said high-side switch and said low-side switch during said work mode; and
   a linear decay circuit for decreasing said current monitor signal from said current monitor signal at a beginning of said non-work mode according to a voltage-dependent current signal formed from said output voltage in said non-work mode; and
   an output impedance having a first terminal for receiving said current monitor signal, and a second terminal for receiving a reference voltage.

7. The switch mode power supply controller of claim 6, wherein said linear decay circuit comprises:
   a voltage follower having a non-inverting input for receiving said output voltage, an inverting input, and an output coupled to said inverting input;
   a transistor having a first current electrode, a control electrode coupled to said output of said voltage follower, and a second current electrode;
   a resistor having a first terminal coupled to said second current electrode of said transistor, and a second terminal coupled to a ground voltage terminal;
   a current mirror having an input coupled to said first current electrode of said transistor, and an output for providing said voltage-dependent current signal;
   a sampling capacitor having a first terminal coupled to said output of said current mirror, and a second terminal coupled to said ground voltage terminal;
   an amplifier having a non-inverting input coupled to said first terminal of said sampling capacitor, an inverting input, and an output; and
   a switch network for coupling said first terminal of said sampling capacitor to said output of said current monitor generator and decoupling said output of said amplifier from said output of said current monitor generator in said work mode, and decoupling said first terminal of said sampling capacitor from said output of said current monitor generator and coupling said output of said amplifier to said output of said current monitor generator in said non-work mode.

8. The switch mode power supply controller of claim 7, wherein said linear decay circuit further comprises:
a disable circuit responsive to a control signal that is active in said non-work mode to discharge a voltage on said first terminal of said sampling capacitor.

9. The switch mode power supply controller of claim 1, wherein said high-side switch, said low-side switch, said pulse width modulation circuit, and said current monitor circuit are combined on a single integrated circuit chip.

10. A method of generating a monitor current, the method comprising:
modulating a first switch and a second switch with a pulse width modulation circuit responsive to a feedback signal to convert an input voltage to an output voltage and deliver an output current to a load;
generating the monitor current that follows the output current;
stopping modulation of the first switch and the second switch regardless of a value of said feedback signal in a non-work mode of operation, said stopping comprising disabling said pulse width modulation circuit; and
during the non-work mode of operation, controlling a decay of the monitor current to follow the output current.

11. The method of claim 10, wherein the decay of the monitor current follows an RC time constant.

12. The method of claim 10, wherein the decay of the monitor current is linear.

13. An integrated circuit switch mode power supply controller, comprising:
a switch terminal adapted to be coupled to an inductor that drives a load;
an enable terminal for receiving an enable signal that is active in a work mode and inactive in a non-work mode;
a feedback terminal for receiving a feedback signal;
a current monitor terminal for providing a current monitor signal;
a high-side switch coupled between an input voltage terminal and said switch terminal;
a low-side switch coupled between said switch terminal and a ground voltage terminal;
a pulse width modulation controller having a first input coupled to said feedback terminal, a second input coupled to said switch terminal, a third input coupled to said enable terminal, a first output coupled to said high-side switch, and a second output coupled to said low-side switch, wherein said pulse width modulation controller operates to drive said high-side switch and said low-side switch with a duty cycle to regulate an output voltage to a desired level in said work mode, and to keep both said high-side switch and said low-side switch non-conductive regardless of values of said first and second inputs in said non-work mode, wherein the integrated circuit switch mode power supply controller disables said pulse width modulation controller in said non-work mode; and
a current monitor circuit having a first input coupled to said switch terminal, a second input coupled to said enable terminal, and an output coupled to said current monitor terminal for providing a current monitor signal representative of a current driven from said inductor to said load, wherein said current monitor circuit forms said current monitor signal by measuring an inductor current during said work mode, and by emulating said inductor current by controlling a decay of said current monitor signal to follow said inductor current during said non-work mode.

14. The integrated circuit switch mode power supply controller of claim 13, wherein said current monitor circuit emulates said inductor current using an RC decay during said non-work mode.

15. The integrated circuit switch mode power supply controller of claim 14, wherein said current monitor circuit comprises:
a current monitor generator for providing said current monitor signal proportional to a measured current flowing through said high-side switch and said low-side switch during said work mode;
an RC decay circuit for decreasing said current monitor signal at a beginning of said non-work mode according to an RC decay that approximates said current from said inductor into a predetermined load during said non-work mode; and
an output impedance having a first terminal coupled to said output of said current monitor generator, and a second terminal for receiving a reference voltage.

16. The integrated circuit switch mode power supply controller of claim 15, wherein said RC decay circuit comprises:
a resistor having a first terminal for receiving a buffered reference voltage, and a second terminal;
a sampling capacitor having a first terminal, and a second terminal coupled to a ground voltage terminal;
an amplifier having a non-inverting input coupled to said first terminal of said sampling capacitor, an inverting input, and an output; and
a switch network for coupling said first terminal of said sampling capacitor to said output of said current monitor generator and decoupling said output of said amplifier from said output of said current monitor generator and said second terminal of said resistor from said first terminal of said sampling capacitor in said work mode, and decoupling said first terminal of said sampling capacitor from said output of said current monitor generator and coupling said output of said amplifier to said output of said current monitor generator and said second terminal of said resistor to said first terminal of said sampling capacitor in said non-work mode.

17. The integrated circuit switch mode power supply controller of claim 13, wherein said current monitor circuit emulates said inductor current using a linear decay during said non-work mode.

18. The integrated circuit switch mode power supply controller of claim 17, wherein said current monitor circuit comprises:
a current monitor generator for providing said current monitor signal proportional to a measured current flowing through said high-side switch and said low-side switch during said work mode; and
a linear decay circuit for decreasing said current monitor signal from said current monitor signal at a beginning of said non-work mode according to a voltage-dependent current signal formed from said output voltage in said non-work mode; and
an output impedance having a first terminal coupled to said output of said current monitor generator, and a second terminal for receiving a reference voltage.

19. The integrated circuit switch mode power supply controller of claim 18, wherein said linear decay circuit comprises:
- a voltage follower having a non-inverting input for receiving said output voltage, an inverting input, and an output coupled to said inverting input;
- a transistor having a first current electrode, a control electrode coupled to said output of said voltage follower, and a second current electrode;
- a resistor having a first terminal coupled to said second current electrode of said transistor, and a second terminal coupled to a ground voltage terminal;
- a current mirror having an input coupled to said first current electrode of said transistor, and an output for providing said voltage-dependent current signal;
- a sampling capacitor having a first terminal coupled to said output of said current mirror, and a second terminal coupled to said ground voltage terminal;
- an amplifier having a non-inverting input coupled to said first terminal of said sampling capacitor, an inverting input, and an output; and
- a switch network for coupling said first terminal of said sampling capacitor to said output of said current monitor generator and decoupling said output of said amplifier from said output of said current monitor generator in said work mode, and decoupling said first terminal of said sampling capacitor from said output of said current monitor generator and coupling said output of said amplifier to said output of said current monitor generator in said non-work mode.

20. The integrated circuit switch mode power supply controller of claim 13, wherein said current monitor circuit further has a fourth input coupled to said voltage input terminal, and a fifth input coupled to said ground voltage terminal.

* * * * *